(12) United States Patent
Okada et al.

(10) Patent No.: US 6,258,398 B1
(45) Date of Patent: Jul. 10, 2001

(54) HARD BUTTER COMPOSITION AND ITS PRODUCTION

(75) Inventors: Tadayuki Okada; Kazuhisa Yamada; Atsushi Nago, all of Osaka-fu (JP)

(73) Assignee: Fuji Oil Company, Limited, Osaka-fu (JP)

( * ) Notice: Subject to any disclaimer, the term of this patent is extended or adjusted under 35 U.S.C. 154(b) by 0 days.

(21) Appl. No.: 09/533,588

(22) Filed: Mar. 23, 2000

(30) Foreign Application Priority Data

Mar. 23, 1999 (JP) .................................................. 11-078710

(51) Int. Cl.⁷ .................................................. A23D 9/013
(52) U.S. Cl. ............................................. 426/607; 426/611
(58) Field of Search .................................. 426/606, 607, 426/611

(56) References Cited

U.S. PATENT DOCUMENTS

| | | | | |
|---|---|---|---|---|
| 4,199,611 | * | 4/1980 | Toyoshima | 426/607 |
| 4,702,928 | * | 10/1987 | Wieske | 426/607 |
| 4,837,041 | * | 6/1989 | Maruzeni | 426/611 |
| 4,839,192 | * | 6/1989 | Sagi | 426/601 |
| 4,847,105 | | 7/1989 | Yokobori et al. | |
| 5,023,101 | * | 6/1991 | Sugihara | 426/607 |
| 5,399,371 | * | 3/1995 | Harris | 426/611 |
| 5,514,405 | * | 5/1996 | Yokomichi | 426/604 |
| 5,879,736 | * | 3/1999 | Fujinaka | 426/607 |
| 5,916,623 | * | 6/1999 | Suwa | 426/611 |
| 5,928,704 | * | 7/1999 | Takeda | 426/607 |
| 5,935,627 | * | 8/1999 | Cain | 426/606 |
| 5,939,114 | * | 8/1999 | Cain | 426/607 |
| 5,972,400 | * | 10/1999 | Bonazelli | 426/606 |

FOREIGN PATENT DOCUMENTS

| | | |
|---|---|---|
| 0081881 | 6/1983 | (EP) . |
| 0321227 | 6/1989 | (EP) . |
| 0354025 | 2/1990 | (EP) . |

OTHER PUBLICATIONS

Swern 1979 Bailey's Industrial Oil and Fat Products vol. 1 4$^{th}$ ed. John Wiley & Sons New York pp. 322–327.*

* cited by examiner

Primary Examiner—Carolyn Paden
(74) Attorney, Agent, or Firm—Wenderoth, Lind & Ponack, L.L.P.

(57) ABSTRACT

A hard butter composition is described that comprises 50 to 80% by weight of SUS type triglycerides, less than 2% by weight of SSS type triglycerides and at least 1% by weight of a polyglycerol fatty acid ester (wherein S's are saturated fatty acid residues which are substantially palmitic acid and/or stearic acid residues and U's are unsaturated fatty acid residues which are substantially C16 and/or C18 unsaturated fatty acids). The composition further comprises SSU type triglycerides in an amount of at least 15% by weight based on the total amount of SUS type triglycerides and SSU type triglycerides. The hard butter composition is a non-tempering type hard butter composition having good meltability in the mouth, which is free from trans acids and lauric acid. A process for producing the hard butter composition is also disclosed.

3 Claims, No Drawings

HARD BUTTER COMPOSITION AND ITS PRODUCTION

BACKGROUND OF THE INVENTION

1. Field of the Invention

The present invention relates to a hard butter composition and its production.

2. Disclosure of the Prior Art

Hard butter used in chocolate is divided into two types, i.e., a tempering type and a non-tempering type, according to need for a tempering step.

Tempering type hard butter contains SUS (1,3-disaturated-2-unsunrared) type triglycerides as its main component and has sharp and good meltability in the mouth. However, tempering type hard butter shows polymorphism, which requires a tempering step, and uses thereof are restricted.

As non-tempering type hard butter which does not require a tempering step, trans acid type hard butter whose main component is tarns type unsaturated fatty acids, and lauric acid type hard butter whose main component is lauric fatty acids have been known. Among them, tarns acid type hard butter has sharp meltability in the mouth. However, it has an inferior flavor due to hydrogenation. In addition, recently, adverse influence on health by trans fatty acids have been reported. Lauric acid type hard butter does not suit cocoa butter. Further, lauric acid type hard butter causes a soapy flavor and this is problematic.

Then, it is desired to develop non-tempering type hard butter which is non-trans acid/non-lauric acid type and has good meltability in the mouth.

Recently, non-tempering type hard butter which is non-trans acid/non-lauric acid type hard butter has been proposed. For example, JP-B 3-78440, JP-B 8-16234 and JP-A 6-14717 propose a hard butter composition comprising as a main component SSU (1,2-disaturated-3-unsaturated) type triglycerides. JP-A 5-211837 proposes a hard butter composition in which SUS type triglycerides as a main component are compounded with SSU type triglycerides. However, these compositions use SSU type triglycerides which are produced by enzymatic interesterification and are expensive.

Then, JP-A 9-285255 proposes a hard butter composition in which SUS type triglycerides as a main component are compounded with SSU type triglycerides produced by random interesterification. However, chocolate produced by using a large amount of this composition has inferior meltability in the mouth because a large amount of SSS (trisaturated) type triglycerides are contained in this composition.

OBJECTS OF THE INVENTION

An object of the present invention is to provide a non-tempering type hard butter composition having good meltability in the mouth, which is free from trans acids and lauric acid.

This object as well as other objects and advantages of the present invention will become apparent to those skilled in the art from the following description.

SUMMARY OF THE INVENTION

As a result of the present inventors' intensive study, it has been found that a fraction obtained by solvent fractionation of palm medium melting point fraction (PMF) to remove high melting point and low melting point fractions therefrom is rich in PPO and POP components and has less PPP component (wherein P is palmitic acid residue, O is oleic acid residue). In addition, it has also been found that a hard butter composition of non-trans acid type/non-lauric acid type, which does not require a tempering step, and has the same or better meltability in the mouth and the same immiscibility with cocoa butter in comparison with conventional non-tempering type hard butter can be obtained by addition of 1% or more of a polyglycerol fatty acid ester to the above fraction. Thus, the present invention has been completed.

That is, according to the present invention, there is provided a hard butter composition which comprises 50 to 80% by weight of SUS type triglycerides based on the composition, less than 2% by weight of SSS type triglycerides based on the composition, at least 1% by weight of a polyglycerol fatty acid ester based on the composition, and SSU type triglycerides in an amount of at least 15% by weight based on the total amount of SUS type triglycerides and SSU type triglycerides, wherein S's are saturated fatty acid residues which are substantially palmitic acid and/or stearic acid residues and U's are unsaturated fatty acid residues which are substantially C16 and/or C18 unsaturated fatty acids.

The present invention also provides a process for producing the hard butter composition.

DETAILED DESCRIPTION OF THE INVENTION

Hard Butter Composition

The SUS type triglycerides used in the present invention are 1,3-disaturated-2-unsaturated triglycerides, wherein S's are saturated fatty acid residues which are substantially palmitic acid and/or stearic acid residues and U's are unsaturated fatty acid residues which are substantially C16 and/or C18 unsaturated fatty acids. Examples of the SUS type triglycerides include 1,3-dipalmitoyl-2-oleoyl glycerin (POP), 1-palmitoyl-2-oleoyl-3-stearoyl glycerin (POSt, St is stearic acid residue), 1,3-distearoyl-2-oleolyl glycerin (StOSt), etc.

The SSS type triglycerides used in the present invention is trisaturated triglycerides, wherein S's are saturated fatty acid residues which are substantially palmitic acid and/or stearic acid residues. Examples of the SSS type triglycerides include tripalmitin (PPP), tristearin (StStSt), etc.

The SSU type triglycerides used in the present invention is 1,2-disaturated-3-unsaturated triglycerides, wherein S's are saturated fatty acid residues which are substantially palmitic acid and/or stearic acid residues and U's are unsaturated fatty acid residues which are substantially C16 and/or C18 unsaturated fatty acids. Examples of the SSU type triglycerides include 1,2-palmitoyl-3-oleoyl glycerin (PPO), 1-palmitoyl-2-stearoyl-3-oleoyl glycerin (PStO), etc.

The polyglycerol fatty acid ester is not limited to that having a specific HLB value and any commercially available polyglycerol fatty acid ester can be used. Examples thereof include those having the average polymerization degree of glycerin of 4 to 8, whose fatty acid residues are palmitic acid, stearic acid, oleic acid, behenic acid, etc.

The hard butter composition of the present invention contains 50 to 80% by weight, preferably 60 to 70% by weight of the SUS type triglycerides based on the total weight of the composition. When the amount of the SUS type triglycerides are less than 50% by weight, chocolate using this hard butter composition has inferior meltability in the mouth.

In order to improve meltability in the mouth, the content of SSS type triglycerides should be minimized. Then, the amount of the SSS type triglycerides should be less than 2% by weight, preferably about 1% by weight or less based on the total weight of the composition. When the amount of the SSS type triglycerides is 2% by weight or more, chocolate using this hard butter composition has inferior meltability in the mouth.

The amount of SSU type triglycerides should be at least 15% by weight, preferably 20% by weight, more preferably 20 to 30% by weight based on the total amount of SUS type triglycerides and SSU type triglycerides. When the amount of SSU type triglycerides is less than 15% by weight based on the total amount of SUS type triglycerides and SSU type triglycerides, the resultant hard butter composition hardly exhibits the function as non-tempering type hard butter and its anti-blooming properties become inferior.

The amount of the polyglycerol fatty acid ester should be at least 1% by weight, preferably at least 2.5% by weight, more preferably 2.5 to 5% by weight based on the total weight of the composition. When the amount of polyglycerol fatty acid ester is less than 1% by weight, immiscibility with cocoa butter becomes inferior upon producing chocolate with the hard butter composition, which restricts the amount of cocoa butter to be used. In addition, when the amount of polyglycerol fatty acid ester is less than 1% by weight, the resultant chocolate has inferior anti-blooming properties. On the other hand, more than 5% by weight of polyglycerol fatty acid ester is undesirable because additional effect is hardly expected any more and the production cost is increased.

Process for Producing the Hard Butter Composition

The hard butter composition of the present invention can be relatively readily produced by adding at least 1% by weight of the polyglycerol fatty acid ester to a fraction obtained by solvent fractionation of palm medium melting point fraction (PMF) to remove high melting point and low melting point fractions therefrom. That is, such a fraction obtained by known solvent fractionation to remove high melting point and low melting point fractions from PMF is rich in PPO and POP components and has less PPP component. Then, the desired hard butter composition of the present invention can be readily obtained by adding the polyglycerol fatty acid ester to the fraction.

For example, the hard butter composition of the present invention can be obtained by fractionating PMF (iodine value (IV): 40 to 50) with acetone to obtain a low melting point fraction (IV: 55 to 60), fractionating the resultant low melting point fraction with hexane to obtain a high melting point fraction (IV: 40 to 45), and adding at least 1% by weight of the polyglycerol fatty acid ester to the resultant high melting point fraction. Preferably, the high melting point fraction is further subjected to solvent fractionation with acetone to remove a low melting point to obtain a high melting point fraction (IV: 36 to 40) and then mixed with the polyglycerol fatty acid ester. The production cost can be significantly reduced by this process in comparison with such a process that the required triglyceride components are prepared by enzymatic interesterification and are compounded with each other.

The hard butter composition of the present invention thus obtained is that of non-trans acid type/non-lauric acid type, which does not require a tempering step, and has the same or better meltability in the mouth and the same immiscibility with cocoa butter. Then, it can be used in confectionery as hard butter for center fillings, etc. in addition to the production of chocolate.

The following Examples and Comparative Examples further illustrate the present invention in detail but are not to be construed to limit the scope thereof. In the following Examples and Comparative Examples, all percents and parts are by weight unless otherwise stated.

EXAMPLE 1

PMF (IV: 45) was subjected to three-stage solvent fractionation to remove its high melting point and low melting point fractions (first, PMF was fractionated with acetone to obtain a low melting point fraction (IV: 57), followed by fractionating the resultant low melting point fraction with hexane to obtain a high melting point fraction (IV: 47) and further fractionating the resultant high melting point fraction with acetone to obtain a high melting point fraction (IV: 38)). To the resultant fraction was added 3% by weight of a commercially available polyglycerol fatty acid ester (SUNFAT PS68™ manufactured by Taiyo Kagaku) was added to obtain the desired hard butter composition.

Its composition is shown in Table 1.

Comparative Example 1

A medium melting point fraction obtained from a random interesterified fat of palm stearin was used as hard butter.

Its composition is shown in Table 1.

Comparative Example 2

PMF was used as hard butter.

Its composition is shown in Table 1.

Comparative Example 3

Hard butter was prepared according to the same manner as described in Example 1 except that the polyglycerol fatty acid ester was not added.

Its composition is shown in Table 1.

TABLE 1

| | Composition (%) | | | |
| --- | --- | --- | --- | --- |
| | Polyglycerol fatty acid ester | SUS content | SSU content | SSS content | SSU/ (SUS + SSU) |
| Example 1 | 3 | 63.8 | 22.4 | 1.1 | 26.0 |

TABLE 1-continued

| | Composition (%) | | | | |
|---|---|---|---|---|---|
| | Poly-glycerol fatty acid ester | SUS content | SSU content | SSS content | SSU/(SUS + SSU) |
| Comparative Example 1 | — | 49.5 | 15.4 | 4.0 | 23.7 |
| Comparative Example 2 | — | 60.8 | 7.0 | 1.1 | 10.3 |
| Comparative Example 3 | — | 63.8 | 22.4 | 1.1 | 26.0 |

According to a conventional manner, a chocolate mix of the recipe of Table 2 was prepared with the above hard butter composition or hard butter. The mix was cast in a cup at 45° C. without tempering and quickly cooled by placing it at 5° C. for 30 minutes to obtain chocolate. Meltability in the mouth and anti-blooming properties of the resultant chocolates were compared. Anti-blooming properties were evaluated by placing the chocolates under circumstances where the ambient temperature varied cyclically (18–30.5° C.) every day and observing generation of blooming.

TABLE 2

| Cacao mass | 10% |
|---|---|
| Whole milk powder | 20% |
| Sugar | 25% |
| β-Lactose | 13% |
| Hard Butter Composition (or hard butter) | 32% |
| Lecithin | 0.4% |
| Vanillin | 0.03% |

The results are shown in Table 3. In Table 3, meltability in the mouth is represented by the following criteria:

A: excellent B: good C: not so good
Anti-blooming properties (18–30.5° C. cycle test, 1 cycle/day) are represented by the following criteria:
−: good ±: loss of gloss +: blooming

TABLE 3

| | Meltability in the mouth | Anti-blooming properties (days) | | | | | |
|---|---|---|---|---|---|---|---|
| | | 5 | 10 | 15 | 20 | 25 | 30 |
| Example 1 | A | − | − | − | − | ± | + |
| Comparative Example 1 | C | + | + | + | + | + | + |
| Comparative Example 2 | A | + | + | + | + | + | + |
| Comparative Example 3 | A | + | + | + | + | + | + |

As seen from Table 3, the chocolate using the hard butter composition of Example 1 had sharp meltability because the hard butter composition contained more SUS component and less SSS component than those of the chocolate using the hard butter of Comparative Example 1. In addition, the chocolate using the hard butter composition of Example 1 had similar melting properties to those of the tempering type hard butter of Comparative Example 2 and exhibited superior anti-blooming properties.

EXAMPLE 2

For comparing the hard butter composition of the above Example 1 with a conventional non-tempering type hard butter, chocolate for a center filling was prepared according to the recipe of Table 4. The conventional non-tempering type hard butter used as the control was PERMEL NTM™ (manufactured by Fuji Oil Company, Ltd.).

TABLE 4

| Cacao mass | 10% |
|---|---|
| Cocoa powder | 2% |
| Whole milk powder | 15% |
| Sugar | 40% |
| Skimmed milk powder | 5% |
| Fat | 28% |
| Lecithin | 0.4% |
| Vanillin | 0.02% |

Namely, a chocolate mix was prepared according to the above recipe and cast in a cup at 45° C. without tempering. The mix was quickly cooled by placing it at 5° C. for 30 minutes to obtain chocolate. Meltability in the mouth and anti-blooming properties of the resultant chocolate were evaluated according to the same manner as described above.

The results are shown in Table 5. In Table 5, the same criteria as those in Table 3 are used.

TABLE 5

| | Meltability in the mouth | Anti-blooming properties (days) | | | | | |
|---|---|---|---|---|---|---|---|
| | | 5 | 10 | 15 | 20 | 25 | 30 |
| Example 1 | A | − | − | − | − | ± | + |
| PERMAL NTM | B | − | − | − | ± | ± | + |

As seen from Table 5, the hard butter composition of Example 1 had inferior meltability in the mouth to that of PERMAL NTM. Regarding anti-blooming properties, the hard butter composition of Example 1 showed the same immiscibility with cocoa butter as that of the non-tempering type hard butter.

What is claimed is:

1. A process for producing a hard butter composition which comprises 50 to 80% by weight of SUS type triglycerides based on the composition, less than 2% by weight of SSS type triglycerides based on the composition, at least 1% by weight of a polyglycerol fatty acid ester based on the composition, and SSU type triglycerides in an amount of at least 15% by weight based on the total amount of SUS type triglycerides and SSU type triglycerides, wherein S's are saturated fatty acid residues which are substantially palmitic acid and/or stearic acid residues and U's are unsaturated fatty acid residues which are substantially C16 and/or C18 unsaturated fatty acids, which process comprises adding the polyglycerol fatty acid ester to a fraction having an iodine value of 40 to 45 obtained by removing high melting and low melting fractions of palm medium melting point fraction (PMF) to obtain a mixture containing at least 1% of the polyglycerol fatty acid ester based on the total weight of the mixture.

2. A process for producing a hard butter composition which comprises 50 to 80% by weight of SUS type triglycerides based on the composition, less than 2% by weight of SSS type triglycerides based on the composition, at least 1% by weight of a polyglycerol fatty acid ester based on the composition, and SSU type triglycerides in an amount of at least 15% by weight based on the total amount of SUS type triglycerides and SSU type triglycerides, wherein S's are saturated fatty acid residues which are substantially palmitic acid and/or stearic acid residues and U's are unsaturated fatty acid residues which are substantially C16 and/or C18 unsaturated fatty acids, which process comprises adding the polyglycerol fatty acid ester to a fraction having an iodine value of 40 to 45 obtained by removing high melting and low melting fractions of palm medium melting point fraction (PMF) to obtain a mixture containing 1 to 5% by weight of the polyglycerol fatty acid ester based on the total weight of the mixture.

3. A process for producing a hard butter composition which comprises 50 to 80% by weight of SUS type triglycerides based on the composition, less than 2% by weight of SSS type triglycerides based on the composition, at least 1% by weight of a polyglycerol fatty acid ester based on the composition, and SSU type triglycerides in an amount of at least 15% by weight based on the total amount of SUS type triglycerides and SSU type triglycerides, wherein S's are saturated fatty acid residues which are substantially palmitic acid and/or stearic acid residues and U's are unsaturated fatty acid residues which are substantially C16 and/or C18 unsaturated fatty acids, which process comprises adding the polyglycerol fatty acid ester to a fraction having an iodine value of 36 to 40 obtained by fractionating palm medium melting point fraction (PMF) with acetone to give a low melting point fraction, fractionating the resultant low melting point fraction with hexane to give a high melting point fraction, and further fractionating with acetone to remove a low melting point fraction, to obtain a mixture containing at least 1% of the polyglycerol fatty acid ester based on the total weight of the mixture.

* * * * *